US007222295B1

(12) United States Patent
    Davis (10) Patent No.: US 7,222,295 B1
(45) Date of Patent: May 22, 2007

(54) METHOD AND APPARATUS FOR CONVEYING DESIGN INFORMATION OF COMPUTER AIDED DESIGN (CAD) MODELS

(75) Inventor: Kenneth L Davis, San Diego, CA (US)

(73) Assignee: Autodesk, Inc., San Rafael, CA (US)

( * ) Notice: Subject to any disclaimer, the term of this patent is extended or adjusted under 35 U.S.C. 154(b) by 1013 days.

(21) Appl. No.: 09/747,332

(22) Filed: Dec. 22, 2000

(51) Int. Cl.
*G06F 17/50* (2006.01)
*G06F 3/01* (2006.01)
*G06F 3/033* (2006.01)
*G06F 19/00* (2006.01)

(52) U.S. Cl. .................. 715/512; 715/500.1; 715/808; 715/852; 715/856; 715/964; 700/97

(58) Field of Classification Search ................ 715/512, 715/502, 500.1; 700/98, 97, 125; 345/859, 345/856, 964, 852, 808, 705, 753, 759
See application file for complete search history.

(56) References Cited

U.S. PATENT DOCUMENTS

| 5,526,478 | A |   | 6/1996 | Russell, Jr. et al. ......... 715/512 |
| 5,551,028 | A |   | 8/1996 | Voll et al. |
| 5,630,041 | A | * | 5/1997 | Mills et al. ................. 345/441 |
| 5,708,764 | A |   | 1/1998 | Borrel et al. |

FOREIGN PATENT DOCUMENTS

WO   PCT/US96/14299     1/1996

OTHER PUBLICATIONS

Folini, Franco. "3D View: a tool to view and share 3D models". SOLID Solutions 1998: p. 2.*
"PC-based CAE tools—facilitate creation of technical documents," EDN—Electronic Design News, Dec. 8, 1988, No. 25, Part I, Newton, MA, USA.

* cited by examiner

*Primary Examiner*—Raymond J. Bayerl
*Assistant Examiner*—Namitha Pillai
(74) *Attorney, Agent, or Firm*—Fish & Richardson P.C.

(57) ABSTRACT

The invention includes computer instructions that detect a cursor in a proximity of a geometry piece of a mechanical design having multimedia associated with the geometry piece. Once the cursor is detected, the instructions automatically generate an icon associated with the geometry piece for accessing the associated multimedia. As a result, CAD model information is conveyed utilizing multimedia associated with one or more geometry pieces of the CAD model. In one embodiment, the computer instructions are part of a mechanical design software application. In one embodiment, the mechanical software application including the computer instructions is embodied in a distribution storage medium.

22 Claims, 7 Drawing Sheets

METHOD AND APPARATUS FOR CONVEYING DESIGN INFORMATION OF COMPUTER AIDED DESIGN (CAD) MODELS

FIELD OF INVENTION

The invention relates to the field of computer aided design (CAD). More specifically, the invention relates to conveying design information of a CAD model through multimedia associated with the CAD model.

BACKGROUND OF THE INVENTION

Computer aided design (CAD) programs have allowed users to design various parts in "virtual" space before the parts ever reach a manufacturer. As these CAD programs become more powerful, these parts in "virtual" space (i.e., CAD models) become more true to life. Complex CAD models, such as, for example, an entire automobile may be fully designed and assembled as multiple CAD models, down to the smallest detail, such as a threads on a screw in the automobile.

Because of the increasing complexity of the CAD models, conveying design information regarding various aspects of the CAD models have become increasingly important, especially since no longer are images of CAD models confined to workstations of engineering departments, but instead, images of CAD models may even be displayed on handheld personal computers, such as, for example, Jornada pocket pc by Hewlett-Packard company of Palo Alto, Calif. This design information may include information, such as how a particular surface on a CAD model was constructed allowing subsequent users to modify or understand the CAD model, i.e., the design intent of previous users. Other information may include information regarding how the CAD model is to be mated with other CAD models, i.e., assembled together. Conveying design information is important not only to other users, but also to manufacturers, marketing people, consumers, and engineers (to name but a few).

One solution to this problem is for the user to manually document the design information and history in a separate text document, such as by using a word processor or text editor. However, this solution does not allow the text document and the corresponding CAD model to be linked. In other words, there is not direct indication in the CAD model of which portions of the design information are further discussed in the separate text document.

Additionally, as forms of conveying information has advanced, digital audio and visual forms (commonly referred to as multimedia) have become increasingly utilized. For example, people commonly send audio video interleaved (.AVI) files through emails. However, ability of modern CAD programs to utilize multimedia for conveying CAD model design information is virtually nonexistent.

Thus, a need exists for an improved way of conveying CAD model design information. This and other advantages will be evident from the disclosure.

BRIEF DESCRIPTION OF DRAWINGS

The invention is illustrated by way of example and not by way of limitation in the figures of the accompanying drawings, in which the like references indicate similar elements and in which.

DETAILED DESCRIPTION OF THE INVENTION

In the following description, various aspects of the invention will be described. However, it will be apparent to those skilled in the art that the invention may be practiced with only some or all aspects of the invention. For purposes of explanation, specific numbers, materials and configurations are set forth in order to provide a thorough understanding of the invention. However, it will also be apparent to one skilled in the art that the invention may be practiced without the specific details. In other instances, well known features are omitted or simplified in order not to obscure the invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system, and the term computer system include general purpose as well as special purpose data processing machines, systems, and the like, that are standalone, adjunct or embedded.

Various operations will be described as multiple discrete steps in turn, in a manner that is most helpful in understanding the invention, however, the order of description should not be construed as to imply that these operations are necessarily order dependent. In particular, these operations need not be performed in the order of presentation.

In various embodiments of the invention, computer aided design (CAD) model information is conveyed utilizing multimedia associated with one or more geometry pieces of the CAD model.

Figure 1:
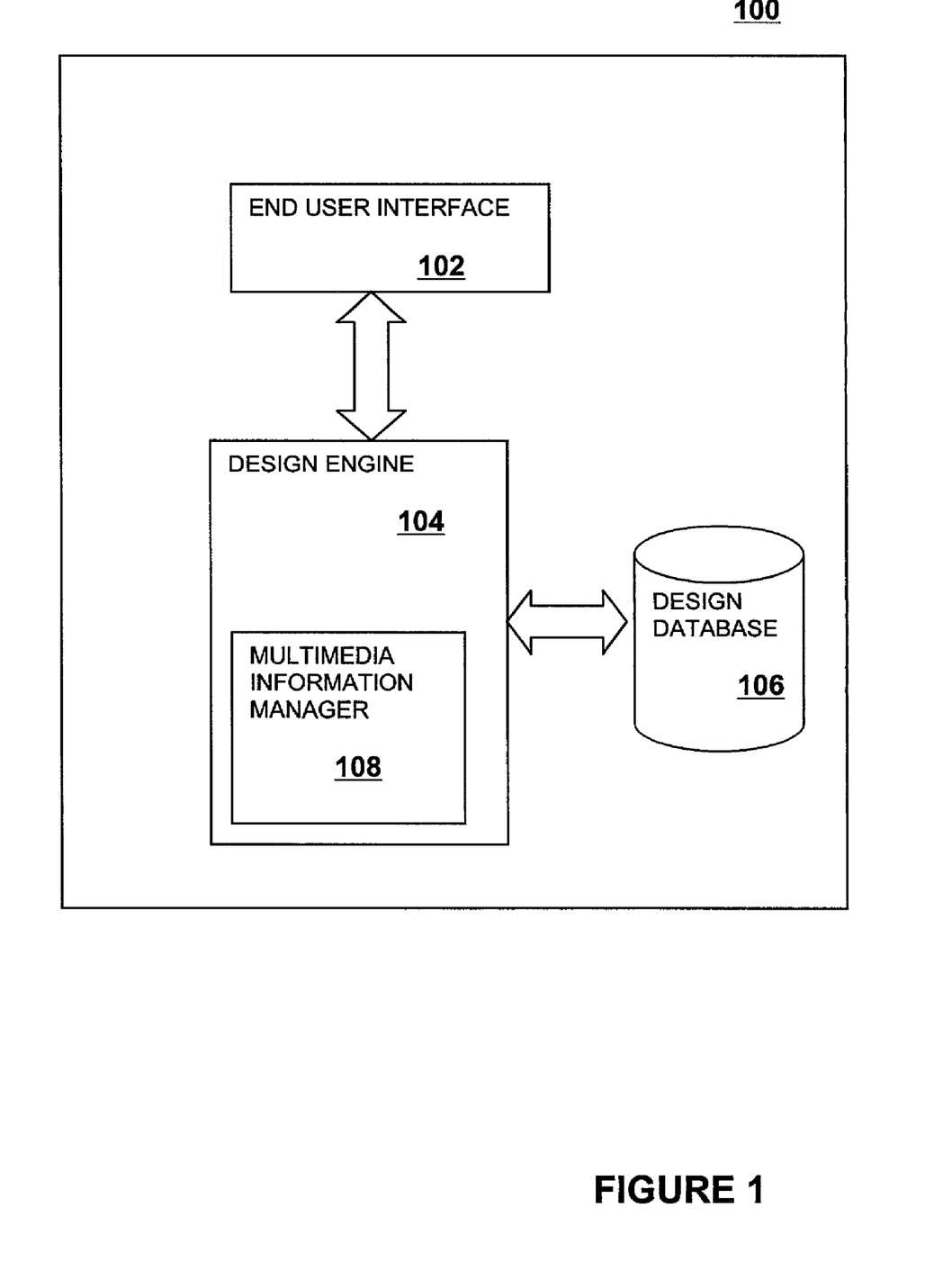
FIG. 1 illustrates a block diagram of one embodiment of a mechanical design application for conveying CAD model design information utilizing multimedia.

FIG. 1 illustrates a block diagram of one embodiment of a mechanical design application for conveying CAD model design information utilizing multimedia. In FIG. 1, mechanical design application 100 includes an end user interface 102, a design engine 104, and a design database 106. The design engine 104 includes, in particular, a multimedia information manager 108 in accordance with the invention. Together, the elements cooperate to conveying CAD model design information utilizing multimedia.

In FIG. 1, the end user interface 102 operates to graphically display and receive input, from a user, of CAD models under the control of the design engine 104. Also under the control of the design engine 104, the design database 106 operates to store CAD models and multimedia information of the CAD models. In particular, the multimedia information manager 108 automatically detects multimedia associated with the CAD models. Except for the teachings of the invention incorporated in the multimedia information manager 108, the mechanical design application 100 is intended to represent a broad range of CAD drawing software known in the art, including but not limited to Autodesk Inventor™, available from Autodesk, Inc. of San Rafael, Calif.

Figure 2:
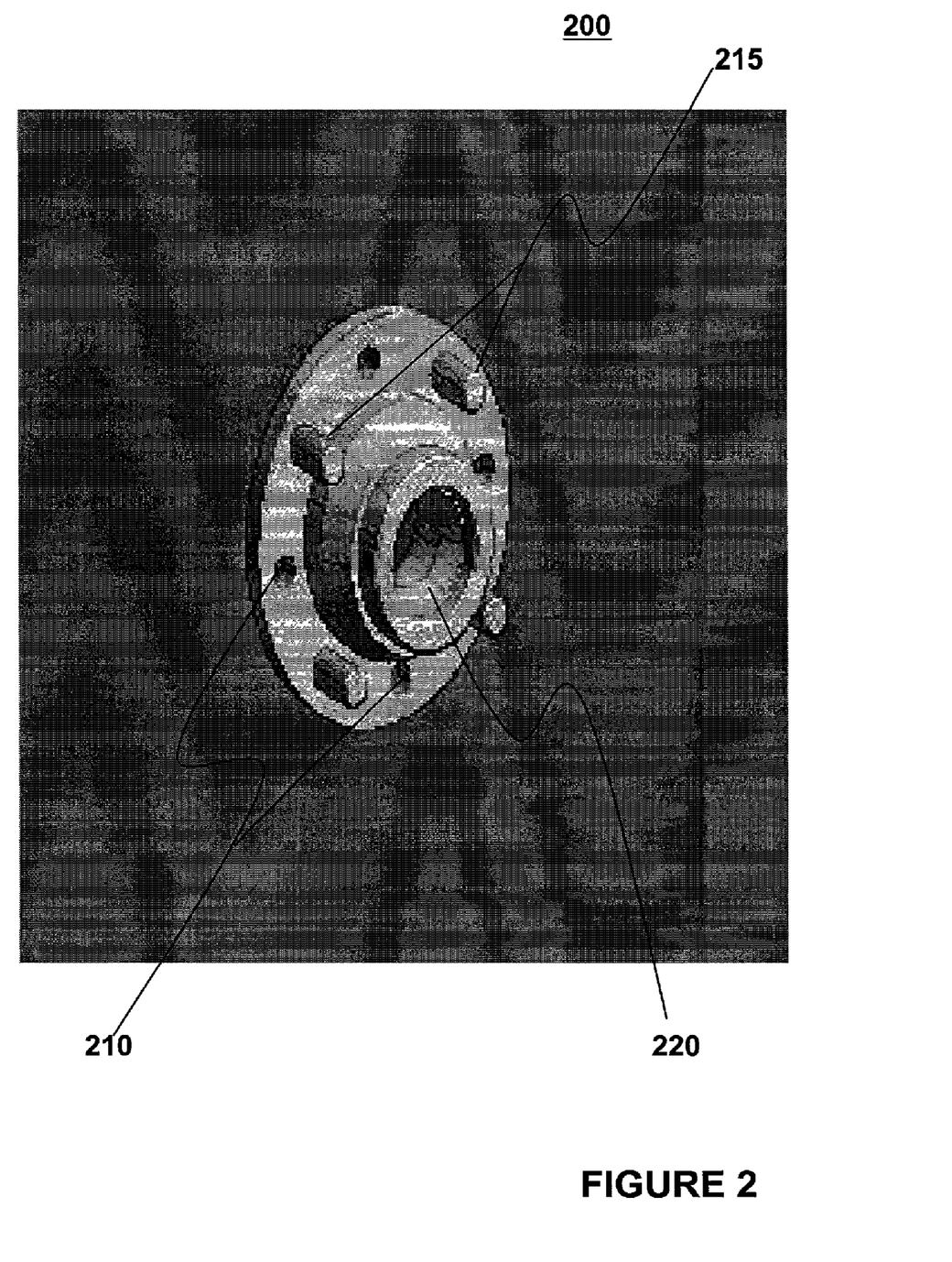
FIG. 2 illustrates an example geometry piece of a mechanical design upon which an embodiment of the invention may be practiced.

FIG. 2 illustrates an example geometry piece of a mechanical design upon which an embodiment of the invention may be practiced. As shown in FIG. 2, the geometry piece of the mechanical design is a three-dimensional CAD model 200. Shown on the CAD model 200 are a number of features, such as for example, mounting holes 210, guide dowels 215 and a center axial hole 220. Additionally, the CAD model 200 may be part of a larger assembly (not shown) with the mounting holes 210 and the guide dowels 215 utilized to join the CAD model 200 to the assembly. In order for proper assembly of the CAD model 200 to the assembly, information regarding utilization of the mounting holes 210 and the guide dowels 215 are required to be conveyed. Additionally, design information regarding the CAD model 200 may also need to be conveyed, such as for example, how certain surfaces are designed and generated for possible modification of the CAD model 200. As will be described in further detail, these types of information regarding a CAD model may be conveyed utilizing multimedia, in accordance with one embodiment of the invention.

Figure 3:
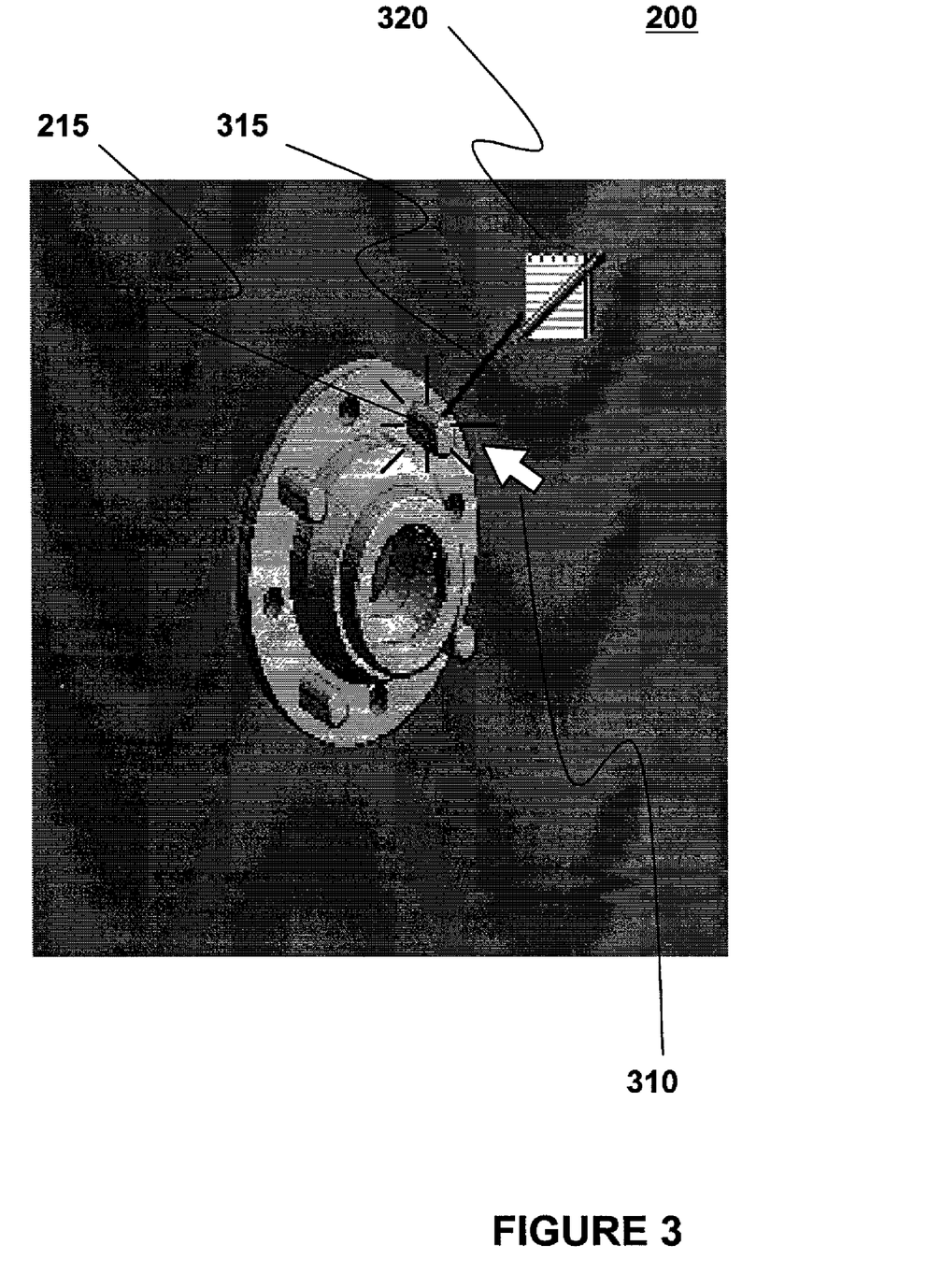
FIG. 3 illustrates one embodiment of the invention for utilizing multimedia to convey CAD model information.

FIG. 3 illustrates one embodiment of the invention for utilizing multimedia to convey CAD model information. In FIG. 3, a user (not shown) moves a cursor 310 in proximity to a geometry piece, in particular, the guide dowel 215. Shown in FIG. 3, as the cursor approaches the proximity of the guide dowel 215, the multimedia information manager 108 determines if multimedia is associated with the guide dowel 215 when the cursor is within a predetermined proximity. In FIG. 3, the multimedia information manager 108 determines if there is multimedia associated with the guide dowel 215, and if it is determined that multimedia is associated with the guide dowel 215, the guide dowel 215 is highlighted, in accordance with one embodiment of the invention.

Upon determining that there is multimedia associated with the geometry piece, the guide dowel 215, the multimedia manager 108 automatically generates and displays a leader line entity 315 and an icon 320. As shown in FIG. 3, the leader line entity 315 extends from the guide dowel 215 to the icon 320 displayed at the opposite end. The icon 320 is associated with the guide dowel 215 for accessing the multimedia associated with the guide dowel 215. Shown in one embodiment of FIG. 3, the displayed icon 320 associated with the guide dowel 215 is a graphical representation of a pencil and notepad signifying that this icon 320 includes a hyperlink to an application for text messaging, such as, but not limited to, Microsoft® Notepad (not shown), an electronic notebook (not shown) for maintaining design information as described in U.S. patent application Ser. No. 09/076,752, and pocket/handheld personal computers (Pocket/Handheld PC) versions.

In one embodiment shown in FIG. 3, since the icon 320 includes a hyperlink to an application to execute the multimedia, the application corresponding to the icon 320, the user only needs to cursor click on the icon 320 to execute the application, i.e., to execute, for example, the electronic notebook. When the icon 320 is cursor clicked, the icon 320 may also include a pointer to a directory where the application may be located with information to be displayed by the application. Information displayed may include, for example, information regarding proper orientation of the guide dowel 215 for joining with the larger assembly. As a result, information regarding the CAD model is conveyed utilizing multimedia.

Figure 4:
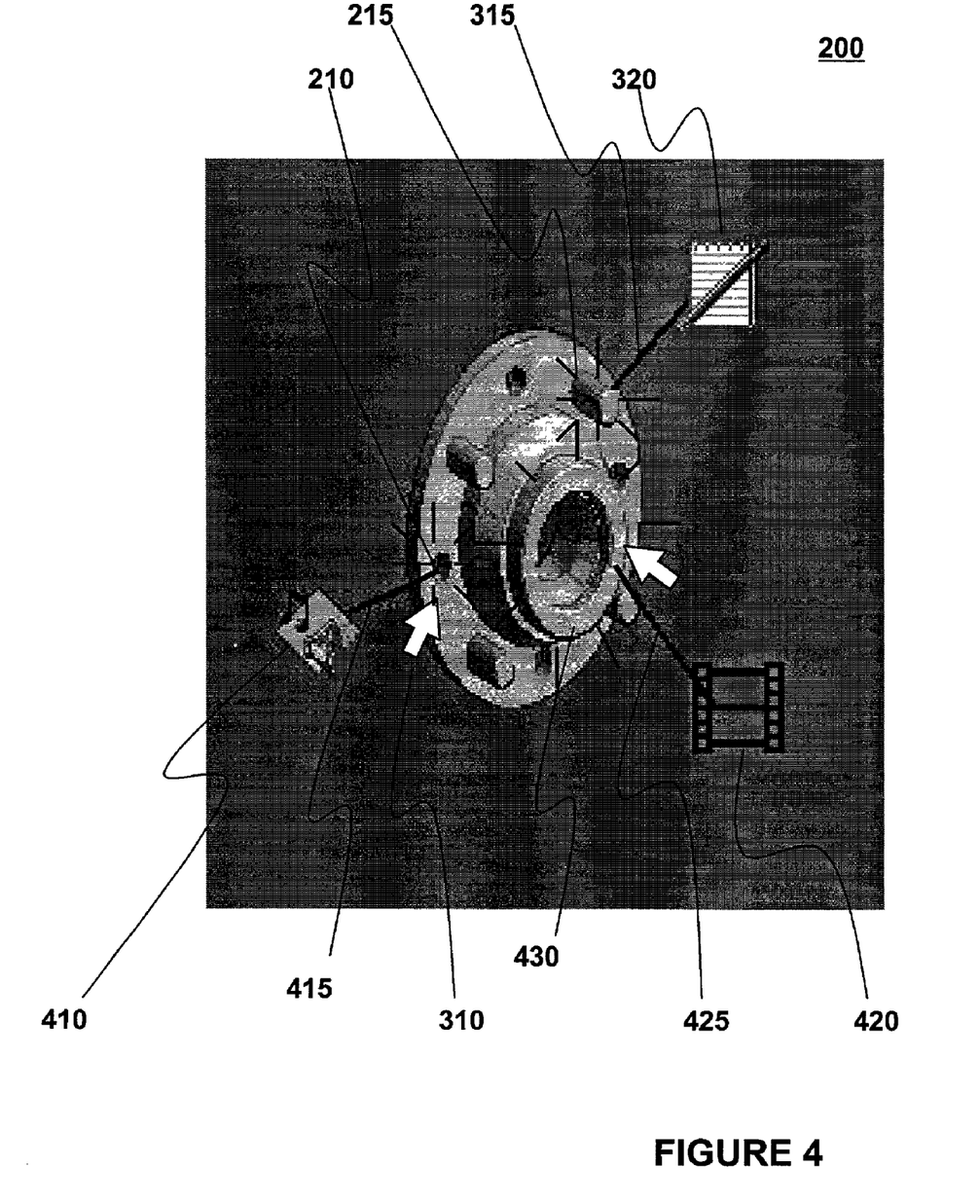
FIG. 4 further illustrates conveying information regarding a CAD model utilizing different types of icons associated with the geometry piece, in accordance with one embodiment of the invention.

FIG. 4 further illustrates conveying information regarding a CAD model utilizing different types of icons associated with the geometry piece, in accordance with one embodiment of the invention. In FIG. 4, the cursor 310 is detected in proximity to a mounting hole 210. The multimedia information manager 108 determines that there is multimedia associated with the mounting hole 210, and upon determining that there is multimedia associated with the mounting hole 210, an icon 410 associated with the mounting hole 210 and its leader line entity 415 is automatically generated and displayed.

Shown in the embodiment of FIG. 4, the displayed icon 410 associated with the mounting hole 210 is a graphical representation of a musical note and a speaker signifying that this icon 410 includes a hyperlink to an application for sound recording, such as, but not limited to, Microsoft® Sound Recorder (not shown) and a Pocket/Handheld PC version.

In one embodiment shown in FIG. 4, since the icon 410 includes a hyperlink to an application to execute the multimedia, the application corresponding to the icon 410, the user only needs to cursor click on the icon 410 to execute the application, i.e., to execute, for example, the Sound Recorder. When the icon 410 is cursor clicked, the icon 410 may also include a pointer to a directory where the application may be located with information to be played by the application. Information played may include, for example, information regarding a last minute note to be aware of a dimensional tolerance for the mounting hole 210, when machining the mounting hole 210. Accordingly, in FIG. 4, an icon 420 and its leader line 425 associated with a surface 430 is also automatically generated and displayed with the icon 420 as a graphical representation of a piece of film signifying that this icon 420 includes a hyperlink to an application for video recording, such as, but not limited to, Windows Media Player by Microsoft® (not shown) and a Pocket/Handheld PC version. The video may convey information for the operations involved in constructing the surface 430 of the CAD model 200.

It should be appreciated by those skilled in the art that the location of the icon and the leader line may be edited by any method know in the art, such as, but not limited to, changing the icon location via cursor selection while the leader line entity follows the icon.

As a result, CAD model information is conveyed utilizing multimedia associated with one or more geometry pieces of the CAD model.

Except for the aspects of utilizing multimedia for conveying CAD model information of the invention, it should be appreciated by those skilled in the art that multimedia applications and hyperlinking to applications are known in the art, and accordingly need not be discussed in further detail.

Figure 5A:
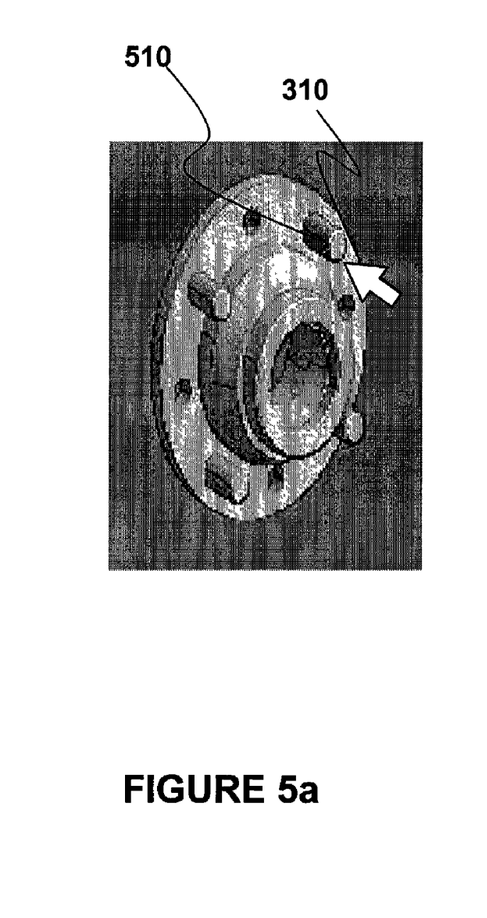
FIGS. 5a, 5b and 5c illustrate conveying CAD model information utilizing multimedia in accordance with an alternate embodiment of the invention.
Figure 5B:
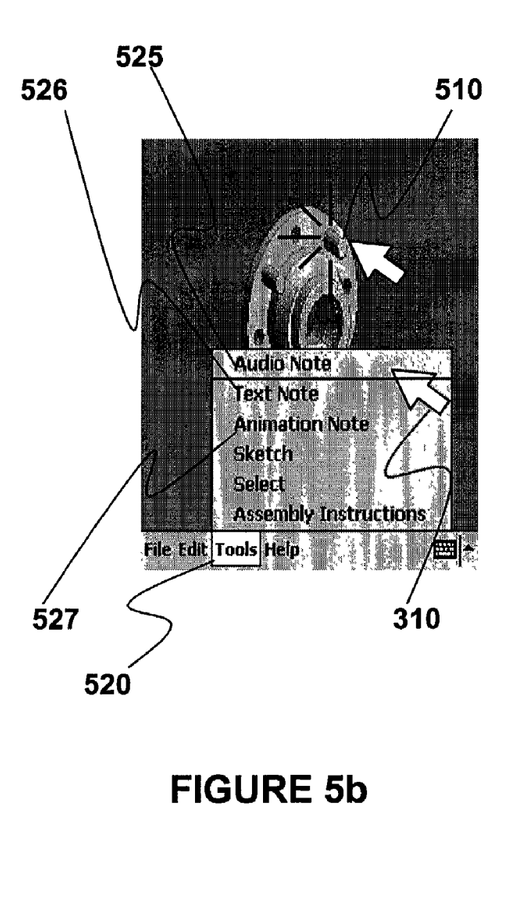
Figure 5C:
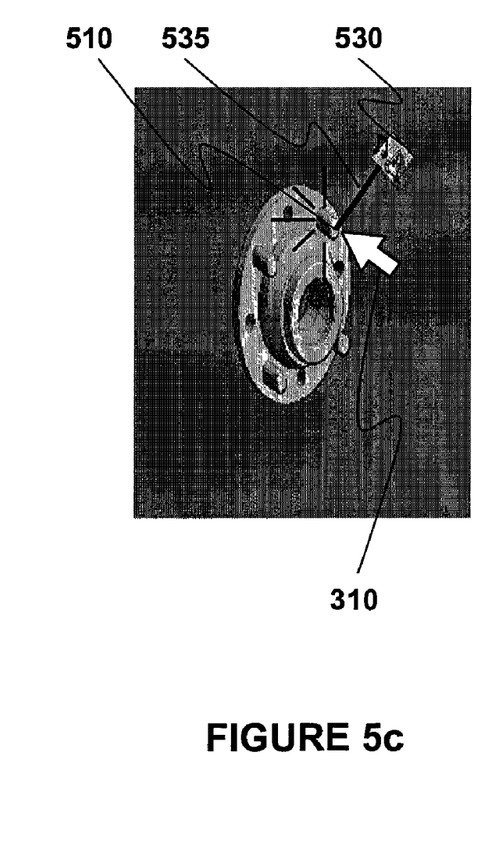

FIGS. 5a, 5b and 5c illustrate conveying CAD model information utilizing multimedia in accordance with an alternate embodiment of the invention. In FIG. 5a, when the cursor 310 is detected in proximity of the geometry piece

200, for example, the guide dowel 510, the multimedia information manager 108 determines that there is no multimedia associated with the guide dowel 510. Further, the multimedia information manager 108 determines if a request to associate multimedia with the guide dowel 510 is received. The request to associate multimedia may be received if the user (not shown) cursor selects the guide dowel 510. As shown in FIG. 5b, if the request to associate multimedia is received, in order to facilitate association of multimedia with the guide dowel 510, a menu 520 is generated and displayed. It should be appreciated by those skilled in the art that the menu 520 might be any type of menu known in the art, such as, but not limited to, a "drop-down" Windows menu. In FIG. 5b, the menu 520 includes several types of multimedia 525–527 that may be associated with the geometry piece, the guide dowel 510, to convey CAD model 200 information, such as, but not limited to, an audio note 525, a text note 526, and an animation note 527. Shown in FIG. 5b, for example, the user has selected to associate a multimedia in the form of an audio note 525 with the guide dowel 510, and the multimedia information manager 108 receives this selection.

Shown in FIG. 5c, in response to receiving the request to associate multimedia with the guide dowel 510 and the selection of the type of multimedia through the facilitation of association of multimedia with the guide dowel 510, the multimedia information manager 108 automatically generates an icon 530 and a leader line entity 535 with the icon 530 opposite the guide dowel 510. Included in the icon 530 is a hyperlink to an application for sound recording, such as, but not limited to, Microsoft® Sound Recorder (not shown) and a Pocket/Handheld PC version. The user (not shown) may create a file for the application by recording the desired audio for the geometry piece, guide dowel 510. Once the user completes the audio note, the multimedia information manager 108 associates the multimedia with the guide dowel 510, and further, if the cursor 310 is no longer detected in proximity to the guide dowel 510, the multimedia information manager 108 hides the leader line entity 535 and multimedia icon 530 associated with the guide dowel 510.

Alternatively, in one embodiment, after receiving the selection of the type of multimedia and automatically generating the icon associated with the geometry piece, the multimedia information manager 108 displays the icon next to geometry piece without generating a leader line entity. A user may manually define a leader line entity from the geometry piece to the icon utilizing any known method in the art, such as, for example, utilizing a pen-and-touch interface where the user "draws" the leader line entity. Once the leader line entity and the icon associated with the geometry piece are displayed, the multimedia information manager 108 combines the manually generated leader line entity with the icon for, as previously described, automatically generating the multimedia associated with the geometry piece.

As a result, CAD model information is conveyed utilizing multimedia associated with one or more geometry pieces of the CAD model with facilitation of a user in selecting the multimedia to be associated.

Figure 6:
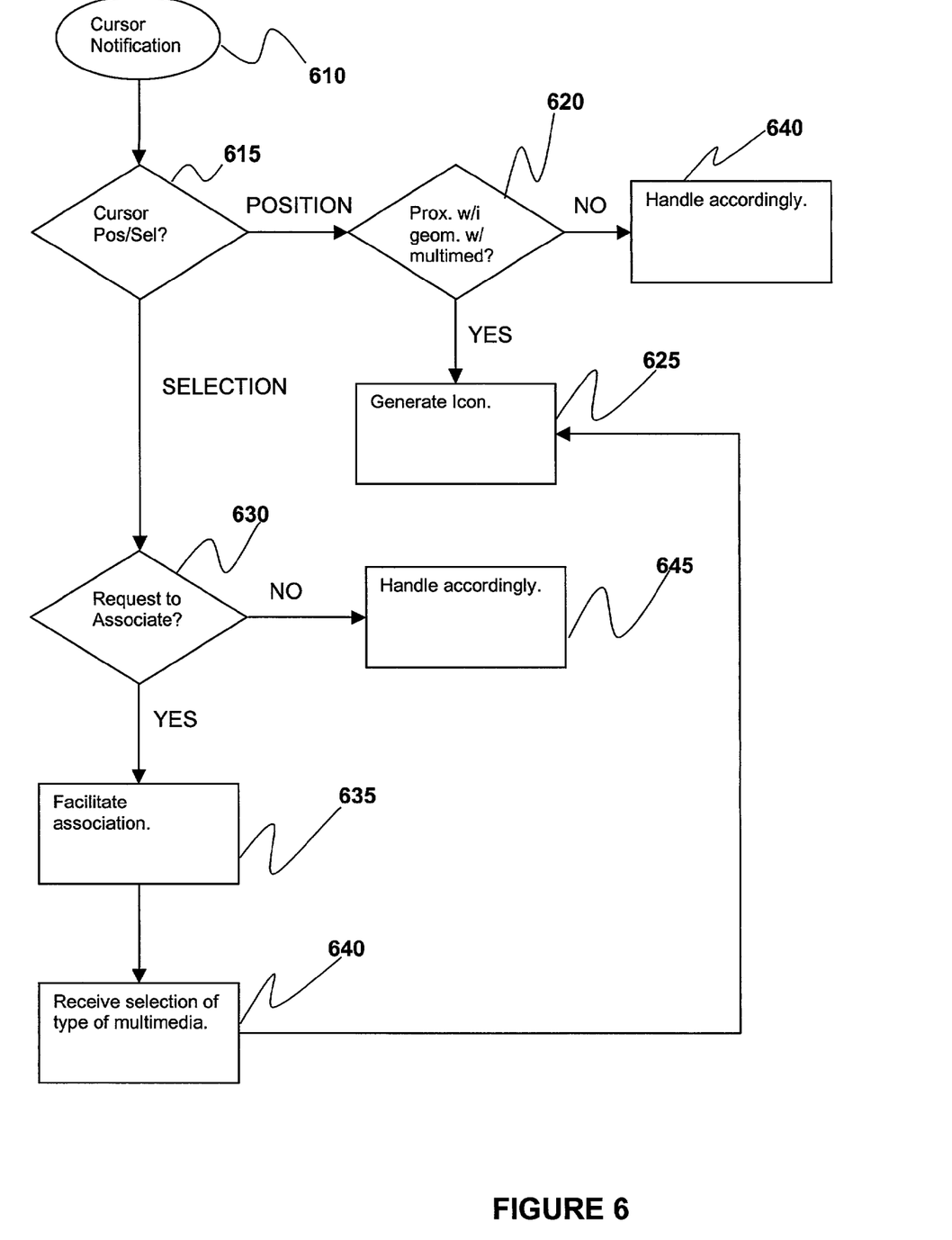
FIG. 6 illustrates the relevant operational flows of one embodiment of the multimedia information manager 108 of FIG. 1.

FIG. 6 illustrates the relevant operational flows of one embodiment of the multimedia information manager 108 of FIG. 1. For the illustrated embodiment, multimedia information manager 108 is programmed in an event driven model, i.e., multimedia information manager 108 is designed to be executed in a system environment where various event notification services are available from the operating system. One example of such an operating system suitable for practicing the invention is the Windows®, Windows® CE, and Pocket PC operating systems, available from Microsoft Corporation of Redmond, Wash. In alternate embodiments, multimedia information manager 108 may be implemented in other programming approaches known in the art.

As shown in FIG. 6, responsive to an event notification informing multimedia information manager 108 of the fact that a cursor is within proximity of a geometry piece 610, multimedia information manager 108 determines if the cursor is held in position or is utilized to select the geometry piece 615.

If the cursor is held in position within the proximity of the geometry piece, the multimedia information manager 108 determines if the multimedia is associated with the geometry piece 620. Upon determining that multimedia is associated with the geometry piece, multimedia information manager 108 causes an icon associated with the geometry piece to be automatically generated for accessing associated multimedia 625. In one embodiment, if the cursor is within the proximity of more than one geometry piece with multimedia associated with it, the multimedia information manager 108 arbitrarily selects and automatically generates the icon associated with one of the geometry pieces until the cursor is moved closer to one of the other geometry pieces.

However, if the multimedia information manager 108 determines that multimedia is not associated with the geometry piece, the multimedia information manager 108 causes other functional blocks of design engine 104 to facilitate utilization of the CAD model by the user 640.

If the cursor is utilized to select the geometry piece, the multimedia information manager 108 determines if a request to associate multimedia with the geometry piece is received 630. If the request to associate multimedia with the geometry piece is received, the multimedia information manager 108 facilitates association of multimedia with the geometry piece 635. As previously described, the request may be received in the form of a cursor selection of the geometry piece, and the facilitation may be in the form of a "drop down" menu displaying one or more types of selectable multimedia.

The multimedia information manager 108 receives a selection of the type of multimedia, when a user selects from the "drop down" menu 640. Once the type of multimedia is received, the multimedia information manager 108 causes automatic generation of an icon associated with the geometry piece for accessing the associated multimedia 625.

However, if the request to associate multimedia with the geometry piece is not received, the multimedia information manager 108 causes other functional blocks of design engine 104 to facilitate utilization of the CAD model by the user 645.

As a result, CAD model information is conveyed utilizing multimedia associated with one or more geometry pieces of the CAD model, including facilitation of selecting multimedia type.

Figure 7:
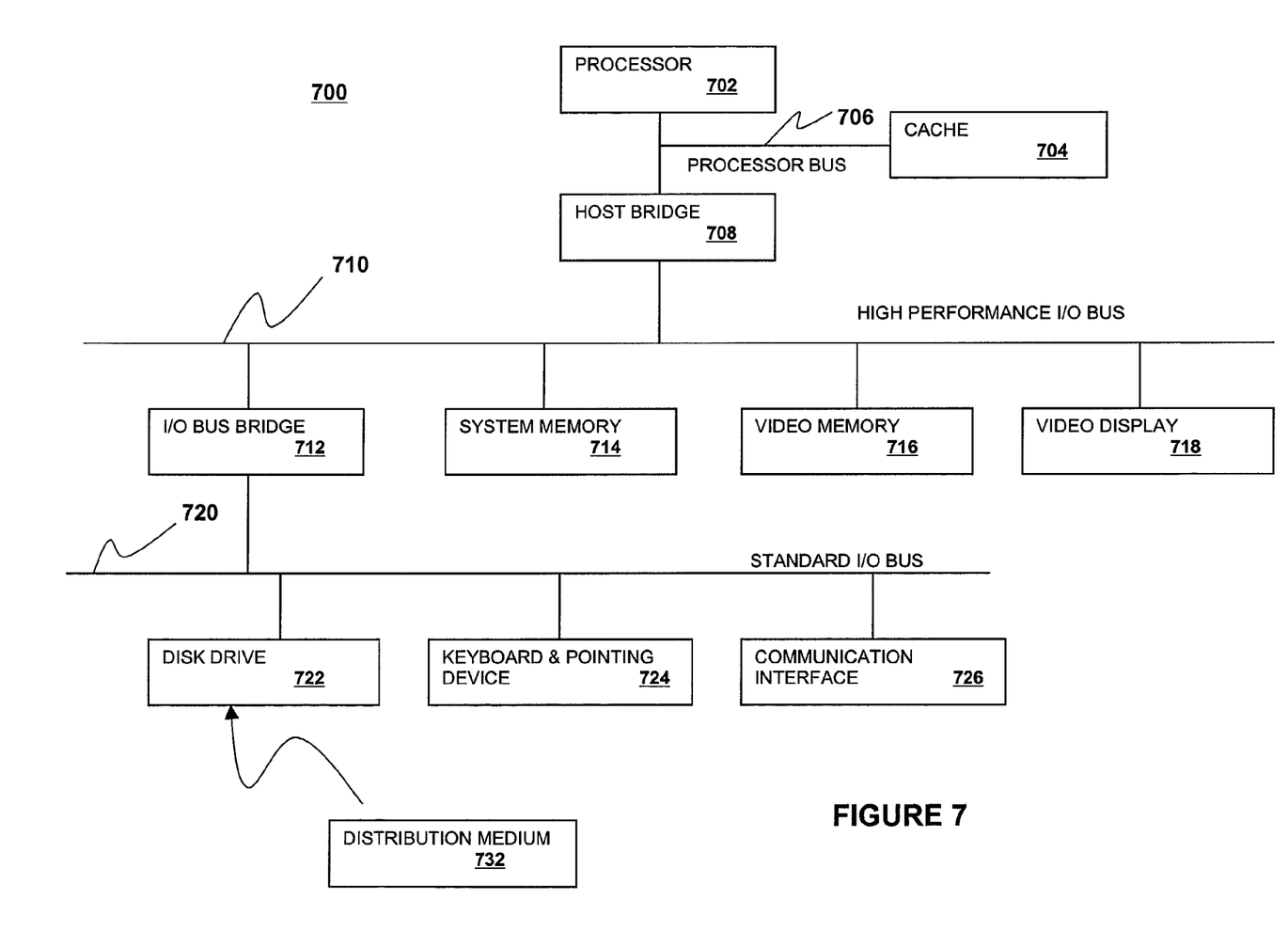
FIG. 7 illustrates one embodiment of a computer system suitable to be programmed with the mechanical design application of the invention.

FIG. 7 illustrates one embodiment of a computer system suitable to be programmed with the mechanical design application of the invention. As shown, for the illustrated embodiment, computer 700 includes processor 702, processor bus 706, high performance I/O bus 710 and standard I/O bus 720. Processor bus 706, and high performance I/O bus 710 are bridged by host bridge 708, whereas I/O buses 710 and 720 are bridged by I/O bus bridge 712. Coupled to processor bus 706 is cache 704. Coupled to high performance I/O bus 710 are system memory 714 and video memory 716, against which video display 718 is coupled.

Coupled to standard I/O bus 720 are disk drive 722, keyboard and pointing device 724, and communication interface 726.

These elements perform their conventional functions known in the art. In particular, disk drive 722 and system memory 714 are used to store permanent and working copies of the mechanical design system incorporated with the teachings of the invention. The permanent copy may be pre-loaded into disk drive 722 in factory, loaded from distribution medium 732, or down loaded from a remote distribution source (not shown). Distribution medium 732 may be a tape, a CD, and DVD or other storage medium of the like. The constitutions of these elements are known. Any one of a number implementations of these elements known in the art may be used to form computer system 700.

In general, those skilled in the art will recognize that the invention is not limited by the details described, instead, the invention can be practiced with modifications and alterations within the spirit and scope of the appended claims. The description is thus to be regarded as illustrative instead of restrictive on the invention.

Thus, an improved way for conveying CAD model design information utilizing multimedia has been described.

What is claimed is:

1. A method comprising:
   detecting a cursor in a proximity of a geometry piece of a computer aided design, the cursor separate from and movable relative to the computer aided design;
   in response to detecting the cursor in the proximity of the geometry piece, determining whether multimedia is associated with the geometry piece of the computer aided design; and
   in response to a positive determination that multimedia is associated with the geometry piece, automatically generating an icon associated with the geometry piece of the computer aided design for accessing the associated multimedia.

2. The method of claim 1, wherein said automatically generating the icon comprises automatically generating a leader line entity from the geometry piece.

3. The method of claim 2 further comprising automatically generating the icon at an end of the leader line entity opposite the geometry piece.

4. The method of claim 1, wherein said automatically generating the icon comprises automatically generating an icon corresponding to a type of multimedia associated with the geometry piece.

5. The method of claim 1, wherein said icon includes a hyperlink to an application to execute the multimedia.

6. The method of claim 1 further comprising:
   determining if a request to associate multimedia with the geometry piece is received;
   facilitating association of multimedia with the geometry piece upon determining that the request to associate multimedia with the geometry piece is received;
   receiving a selection of a type of multimedia to be associated with the geometry piece; and
   automatically generating an icon associated with the geometry piece for accessing the associated multimedia.

7. The method of claim 6, wherein said receiving the request comprises receiving a cursor selection on the geometry piece.

8. The method of claim 6, wherein said facilitating comprises generating and displaying a menu for selection of a type of multimedia to be associated with the geometry piece.

9. The method of claim 8, wherein said receiving the selection of the type of multimedia comprises receiving the selection of at least one of an audio note, a textual note, and an animation note.

10. The method of claim 6 further comprising receiving an inputted leader line entity.

11. An article comprising a machine accessible medium having instructions encoded therein, said instructions, which when executed by a machine, operate to:
    detect a cursor in a proximity of a geometry piece of a computer aided design, the cursor separate from and movable relative to the computer aided design;
    in response to detecting the cursor in the proximity of the geometry piece, determine whether multimedia is associated with the geometry piece of the computer aided design; and
    in response to a positive determination that multimedia is associated with the geometry piece, automatically generate an icon associated with the geometry piece of the computer aided design for accessing the associated multimedia.

12. The article of claim 11, wherein said executing instructions operate to automatically generate a leader line entity from the geometry piece.

13. The article of claim 12, wherein said executing instructions further operate to automatically generate the icon at an end of the leader line entity opposite the geometry piece.

14. The article of claim 11, wherein said executing instructions operate to automatically generate an icon corresponding to a type of multimedia associated with the geometry piece.

15. The article of claim 11, wherein said executing instructions operate to include a hyperlink to an application to execute the multimedia.

16. The article of claim 11, wherein said executing instructions further operate to determine if a request to associate multimedia with the geometry piece is received, facilitate association of multimedia with the geometry piece upon determining that the request to associate multimedia with the geometry piece is received, receive a selection of a type of multimedia to be associated with the geometry piece, and automatically generate an icon associated with the geometry piece for accessing the associated multimedia.

17. The article of claim 16, wherein said executing instructions operate to receive a cursor selection on the geometry piece.

18. The article of claim 16, wherein said executing instructions operate to generate and display a menu for selection of a type of multimedia to be associated with the geometry piece.

19. The article of claim 18, wherein said receiving the selection of the type of multimedia comprises receiving the selection of at least one of an audio note, a textual note, and an animation note.

20. The article of claim 16, wherein said executing instructions further operate to receive an inputted leader line entity.

21. An apparatus comprising:
    a machine accessible medium having instructions encoded therein, said instructions, which when executed by a machine, operate to:
    detect a cursor in a proximity of a geometry piece of a computer aided design, the cursor separate from and movable relative to the computer aided design;

in response to detecting the cursor in the proximity of the geometry piece, determine whether multimedia is associated with the geometry piece of the computer aided design; and in response to a positive determination that multimedia is associated with the geometry piece, automatically generate an icon associated with the geometry piece of the computer aided design for accessing the associated multimedia; and a processor coupled to the machine accessible medium to execute said instructions.

22. The apparatus of claim 21, wherein said executing instructions further operate to determine if a request to associate multimedia with the geometry piece is received, facilitate association of multimedia with the geometry piece upon determining that the request to associate multimedia with the geometry piece is received, receive a selection of a type of multimedia to be associated with the geometry piece, and automatically generate an icon associated with the geometry piece for accessing the associated multimedia.

* * * * *